United States Patent [19]

Hatano et al.

[11] Patent Number: 5,689,811
[45] Date of Patent: Nov. 18, 1997

[54] COMMUNICATION SYSTEM FOR COMMUNICATING INFORMATION ASCERTAINING WHY REPLY INFORMATION WAS NOT TRANSMITTED

[75] Inventors: Rikuo Hatano, Toyota; Toshimitsu Oka, Okazaki, both of Japan

[73] Assignee: Aisin Seiki Kabushiki Kaisha, Kariya, Japan

[21] Appl. No.: 769,871

[22] Filed: Dec. 19, 1996

Related U.S. Application Data

[63] Continuation of Ser. No. 763,706, Sep. 23, 1991, abandoned.

[30] Foreign Application Priority Data

Sep. 22, 1990 [JP] Japan ............................ 2-252840

[51] Int. Cl.[6] .................................................. H04Q 7/20
[52] U.S. Cl. ...................... 455/54.2; 379/58; 340/825.08
[58] Field of Search ............................ 455/53.1, 54.1, 455/54.2, 281, 33.1, 38.1; 379/58, 59; 340/825.08, 825.15, 825.16, 825.17, 825.44, 825.49, 825.54, 825.55

[56] References Cited

U.S. PATENT DOCUMENTS

| | | | |
|---|---|---|---|
| 3,876,980 | 4/1975 | Haemmig et al. | 455/54 |
| 3,899,772 | 8/1975 | Mead et al. | 455/54 |
| 4,009,375 | 2/1977 | White et al. | 455/54 |
| 4,162,449 | 7/1979 | Bouyssounouse et al. | 455/54 |
| 4,737,977 | 4/1988 | Norman | 379/58 |
| 4,891,637 | 1/1990 | Siwiak et al. | 340/825.44 |
| 4,928,099 | 5/1990 | Drake | 379/59 |
| 4,940,963 | 7/1990 | Gutman et al. | 340/825.44 |
| 4,965,821 | 10/1990 | Bishop et al. | 379/59 |
| 5,025,486 | 6/1991 | Klughart | 455/54 |
| 5,133,081 | 7/1992 | Mayo | 455/18 |
| 5,153,582 | 10/1992 | Davis | 340/825.44 |
| 5,161,255 | 11/1992 | Tsuchiya | 455/281 |

FOREIGN PATENT DOCUMENTS 0197598 of 1983 Japan.
58-197598 11/1983 Japan.

Primary Examiner—Edward F. Urban
Attorney, Agent, or Firm—Sughrue, Mion, Zinn, Macpeak and Seas

[57] ABSTRACT

An information communication system including an order station for transmitting a command signal to a mobile station, the mobile station including a memory for storing information representing that it has received the transmitted command signal from the order station, but has not responded to the command signal.

8 Claims, 5 Drawing Sheets

COMMUNICATION SYSTEM FOR COMMUNICATING INFORMATION ASCERTAINING WHY REPLY INFORMATION WAS NOT TRANSMITTED

This is a Continuation of application Ser. No. 07/763,706 filed Sep. 23, 1991 now abandoned.

BACKGROUND OF THE INVENTION

The present invention relates to an information communicating system and in particular to an information communicating system between an order station and a mobile station.

In a conventional information communicating system which is disclosed in Japanese Patent Laid-open Print No. 58(1983)-197598, each of plural mobile stations is under the control of an order station over the radiophone. In this system, when the mobile station is mounted on a vehicle such as a taxi, the mobile station is set to be under an obligation to make a response to the order station immediately upon receipt of a command therefrom.

In this system, sometimes the response may not be established due to the fact that the vehicle is in a tunnel or behind a building. In addition, an intention of an operator of the mobile station is also considered as a cause of the no-response. From the view point of the effective operation of the system and the labor management, the intentional cause should be distinguished from for example, a transmission problem. However, such request or distinction can't be established in the conventional system.

SUMMARY OF THE INVENTION

It is, therefore, a principal object of the present invention to provide an information communicating system which is able to comply with the foregoing request.

Another object of the present invention is to provide an information communicating system in which it can be revealed whether no response is due to an inevitable fact or not.

In order to attain the foregoing objects, an information communicating system is comprised of an order station transmitting a command to a mobile station, a response device for transmitting an information to the order station in response to the command therefrom, a memory device for storing a fact when the mobile station does not respond to the command despite receiving the command, and additional device for transmitting the fact to the order station upon first response of the mobile station to the command station.

Other and further objects of the present invention will become obvious upon an understanding of the illustrative embodiment about to be described or will be indicated in the appended claims.

DETAILED DESCRIPTION OF THE PREFERRED EMBODIMENT

Figure 2:
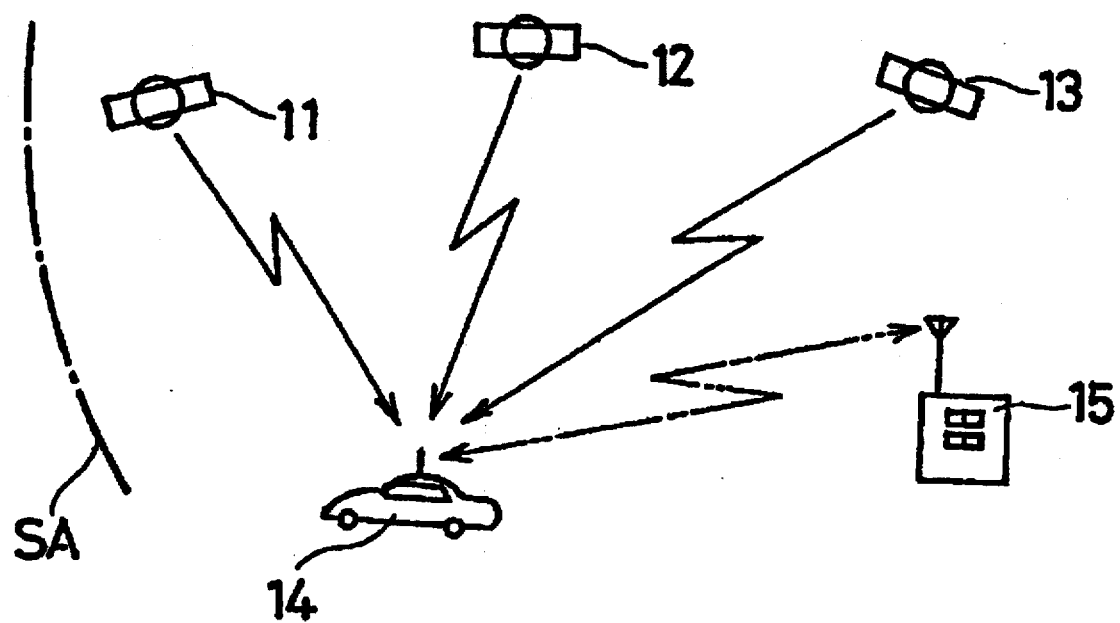
FIG. 2 is a conceptional view of an information communicating system according to the present invention.

First of all, as shown in FIG. 2, an information communicating system SA includes an order station 15 and a plurality of mobile stations 14 (only one is shown) each of which is mounted on a vehicle such as a taxi or a special purpose vehicle for the police or the military. The mobile stations 14 are under the control of the order station 15 and each mobile station 14 is set to be under an obligation to make a response to the order station 15 immediately upon receipt of a command therefrom. It is noted that each mobile station 14 can know its current position by receiving electromagnetic wave from each of artificial satellites 11, 12 and 13 of GPS (Global Positioning System). The current position of each mobile station 14 is set to be sent to the order station 15.

Figure 1:
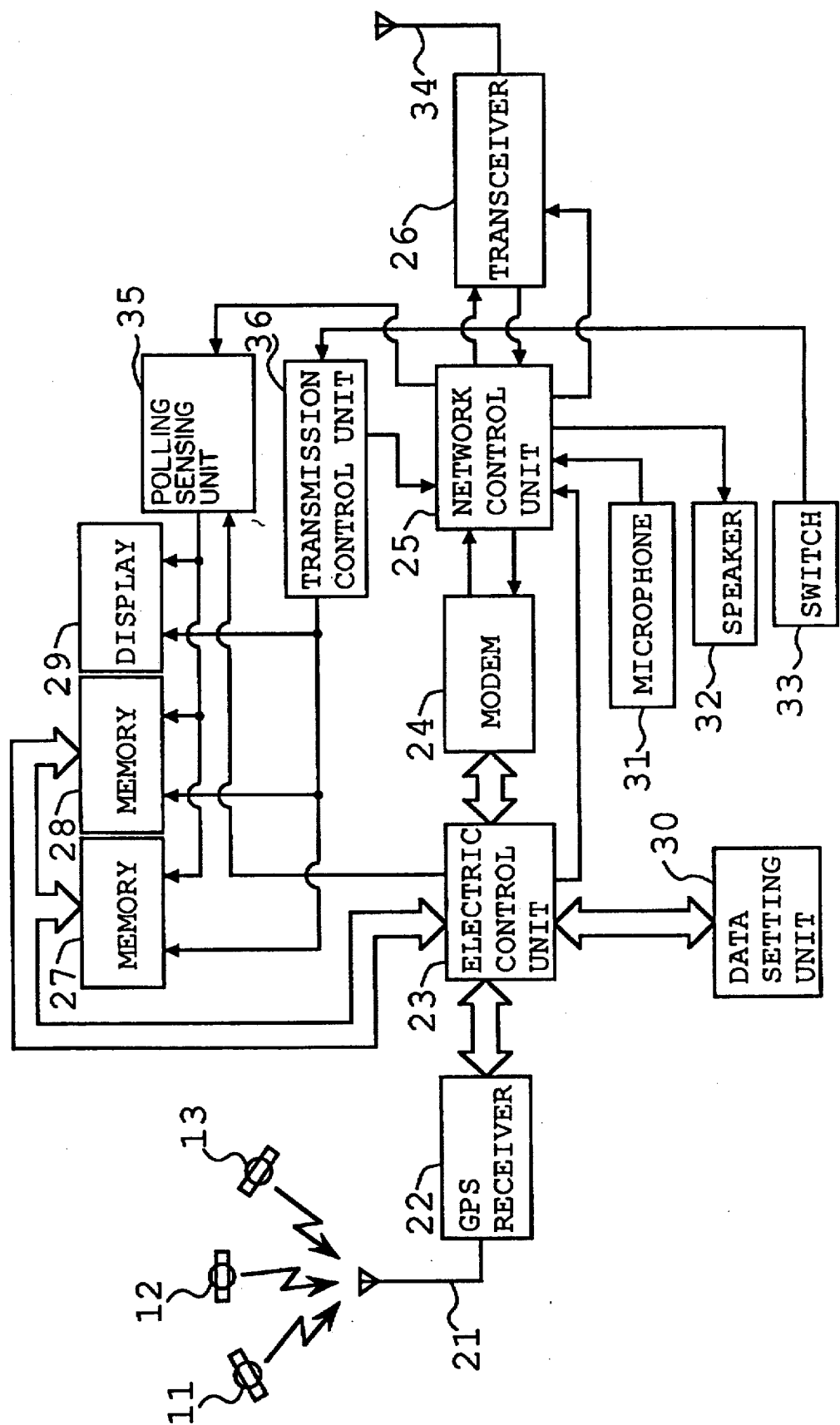
FIG. 1 is a block diagram of a mobile station which is an essential element or device of an information communicating system according to the present invention.

Referring now to FIG. 1, the mobile station 14 includes an antenna 21 for receiving electromagnetic wave from each of artificial satellite 11, 12 and 13, a GPS receiver 22, an electric control unit (ECU) 23, a modem 24, a network control unit (NCU) 25, a transceiver 26, memories 27 28, and a display 29, a data setting unit 30, a microphone 31, a speaker 32, a switch 33, an antenna 34 coupled to the transceiver 26, a polling sensing unit 35 and a transmission control unit 36. The GPS receiver 22 is set to receive signal relating to data of latitude and longitude from each of the artificial satellites 11, 12 and 13. The resultant data is then fed to the electric control unit 23 to be calculated therein for obtaining the current position of the mobile vehicle 14.

The memory 27 is set to store information relating to the mobile station 14 per se such as the current position thereof, the time when the mobile station receives a command from the order station 15 and related matter. The memory 28 is set to store the conditions of the mobile station 14 such as the empty or not and the carrying capacity of the vehicle. The modem 24, after modulating information from the electric control unit 23, fees the resultant or modulated data to the network control unit 25. The modem 24 is also used for demodulating information from the network control unit 25 and the resultant data is fed to the electric control unit 23. The polling sensing unit 35 is so connected to the network control unit 25 as to be checked whether the mobile station 14 receives the command from the order station 15 or not.

The data setting unit 30, which is used for setting the condition of the mobile station 14, and is set to be manipulated by the operator of the mobile station 14 relating to whether or not the vehicle, is empty the capacity of the vehicle and/or related matters.

The network control unit 25, the microphone 31, the speaker 32, the switch 33, the transmission control unit 36, the transceiver 26 and the antenna 34 constitute a radiophone or a wireless telephone. By turning on the switch 33, the transmission control unit 36 enables the transmission of the message using the microphone 31 from the mobile station 14 to the order station 15 and/or one or more other mobile stations over the radiophone. On the other hand, by turning off the switch 33, the reception of the message by using the speaker 32 from the order station 15 or one of other mobile stations over the radiophone.

Figure 3:
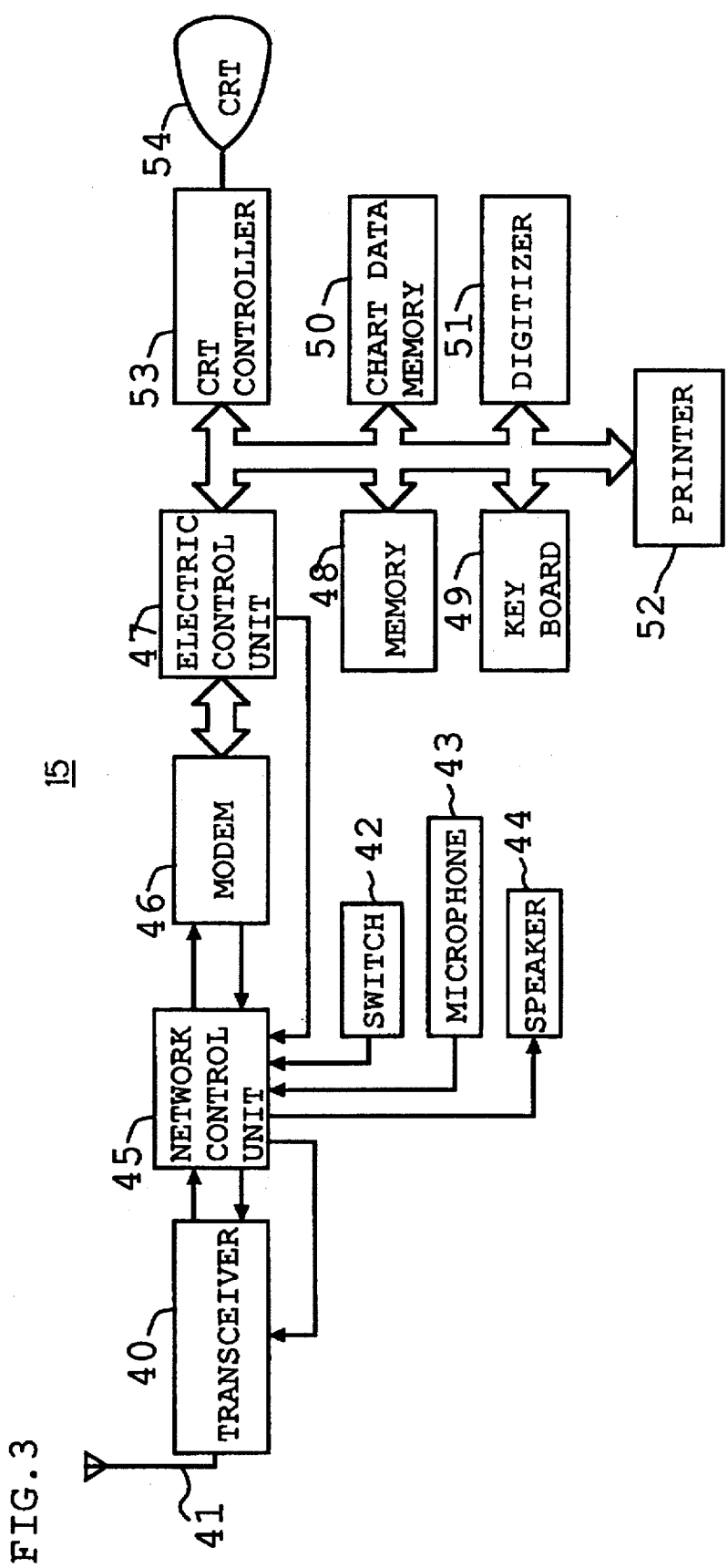
FIG. 3 is a block diagram of an order station which is an essential element of an information communicating system according to the present invention.

Referring to FIG. 3 in which the whole construction of order station 15 is shown in the form of a block diagram. The order station 15 includes an antenna 41, a transceiver 40, a switch 42, a microphone 43, a speaker 44, a network control unit (NCU) 45, a modem 46, an electric control unit (ECU) 47, a memory 48, a keyboard 49, a chart data memory 50, a digitizer 51, a printer 52, a CRT controller 53 and a cathode ray tube (CRT) 54. The antenna 41, the transceiver 40, the switch 42, the microphone 43, the speaker 44 and the network control unit 45 constitute a radiophone or a wireless telephone. By turning on or off the switch 42 connected to the network control unit 45, this radiophone can operate similar to the radiophone of the mobile station side.

The electric control unit 47 is connected to the keyboard 49, the digitizer 51, the memory 48, the modem 46 and the network control unit 45. Based on the manipulation of the keyboard 49, the electric control unit 47 generates a calling signal or a command signal and the resultant signal is, after being modulated in the modem 46, set to be transmitted by the transceiver 40 to the transceiver 14 of the mobile station 26. The signal received at the antenna 41 of the transceiver 40 is demodulated at the modem 46 and the resultant signal is then fed into the electric control unit 47. The signal is related to the current position of the mobile station 14 and/or an ID signal thereof. The signal is set to be stored in the memory 48.

As mentioned above, a communication between each mobile station 14 and the order station 15 can be established over the radiophone in the form of a voice signal and/or a digital signal.

Furthermore, the electric control unit 47 is connected to the printer 52, the CRT controller 53 and the chart data memory 50. The chart data memory stores each data indicating an area which is within the communication ability of the order station 15. The electric controller 47 selects data relating to one or more communicable areas from the chart data memory 50 and one or more mobile stations 14 each of which is within one of the selected areas. The resultant items are fed to the CRT controller 53 and are then displayed on the screen of the CRT 54. Items on the screen can be printed out via the printer 52 which is under the control of the keyboard 49. Data in the memory 48 can be printed out similarly.

Figure 4:
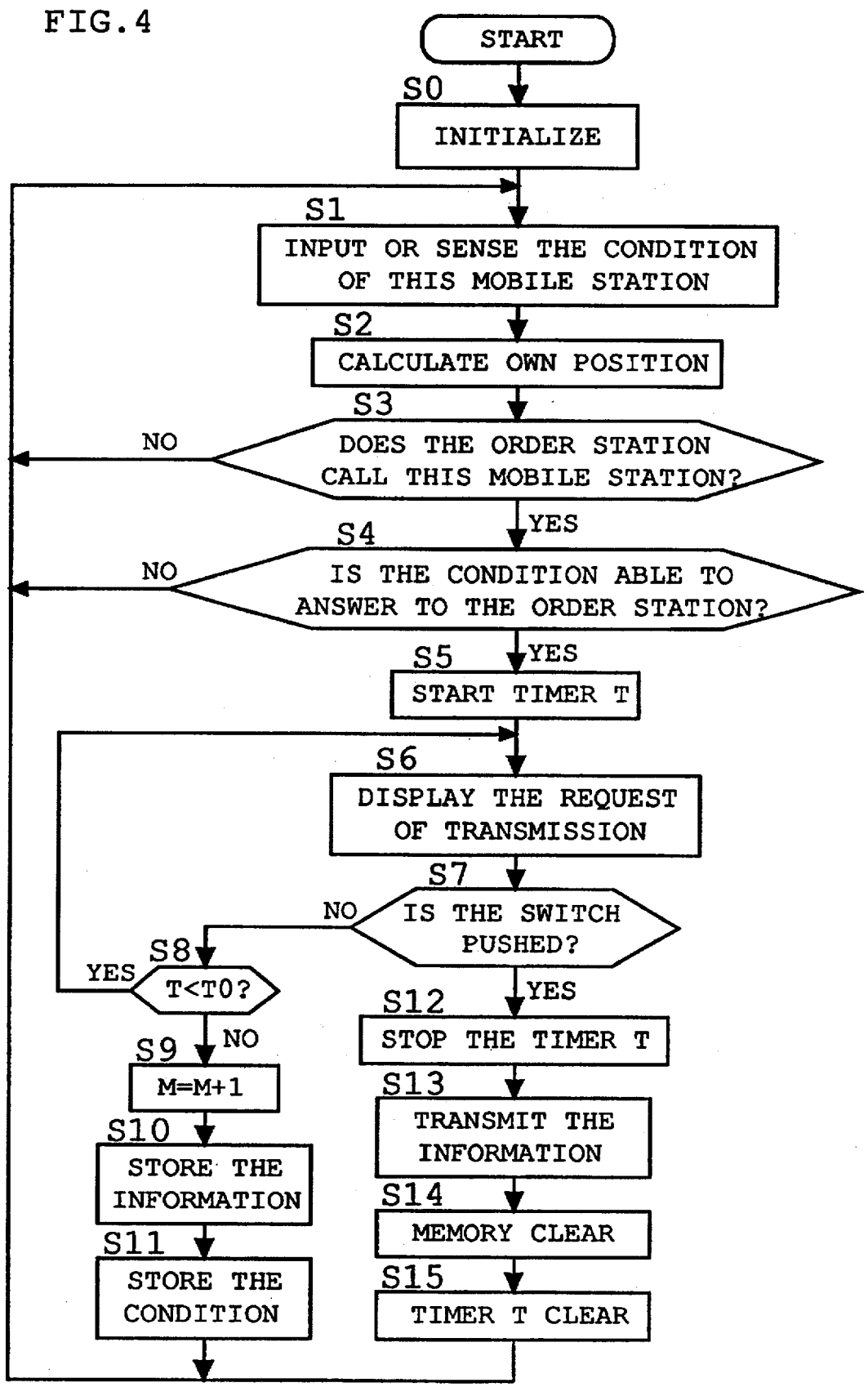
FIG. 4 is a flowchart showing an operation of a control unit of a mobile station.

The detailed operation of the mobile station 14 will be hereinafter described based on a flowchart shown in FIG. 4. Upon turning-on of the electric control unit 23, in step S0, an initialization is performed and the condition of the mobile station 14 is inputted into or sensed by the data setting unit 30. In the taxi example, if there is no passenger, the empty flag is set. In step S2, the current position of the mobile station 14 is calculated. In step S3, it is checked whether or not the vehicle is under the calling from the order station 15. If not, the control goes to step S1. If so, step S4 is executed for checking the condition of the mobile station 14. That is to say, in the case of the taxi, if it is empty, the empty flag is remained to be set and the taxi is ready for reply. If there is at least one passenger, the empty flag is released and the control goes to step S1. In such a case, the order station 15 has to call another mobile station 14.

In step S5, a timer begins to start. In step S6, matter to be transmitted from the mobile station 14 to the order station 15 is indicated on the screen of the display 29. The response or transmission to the order station 15 is initiated by turning on the switch 33. In step S7, it is checked whether or not the switch 33 is turned on. If not, it is checked in step S8 whether or not the time-passed is less than a predetermined set value of T0. If so, the control goes to step S6. If not, the calculation of M=M+1 is established for counting how many times the mobile station 14 does not respond to the order station 15 within a limited time. The current position and the condition information are stored into the memories 27 and 28 in steps S10 and S11. The control then goes to step S1.

When the switch 33 has been turned on, in step S12, the timer T is stopped and the position information, Identification of the vehicle (i.e., the vehicle assigned number M) is transmitted to the order station 15 in step 13. In steps 14 and 15, M is cleared and the timer T is reset, respectively.

Figure 5:
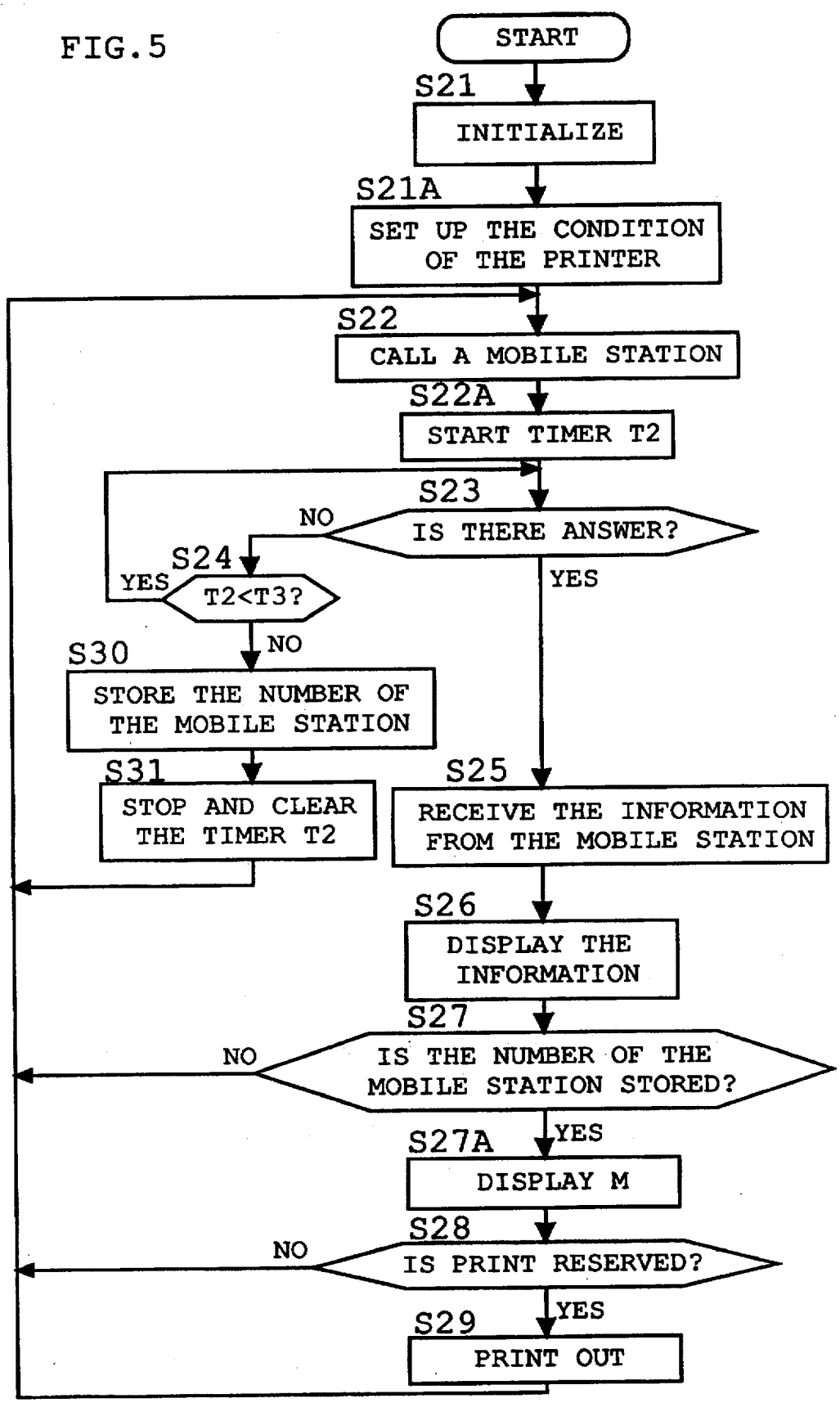
FIG. 5 is a flowchart showing an operation of a control unit of an order station.

On the other hand, the detailed operation of the order station 15 will be described based on a flowchart shown in FIG. 5. When the electric control unit 47 is turned on, an initialization is established in step 21. In step S21A, the printer 52 is set into a ready operation by manipulating the keyboard 49. In step S22, any one of the mobile stations 14 is called by inputting the identification thereof through the keyboard. Then, a timer T2 is initiated in step S22A. It is noted that selection of the mobile station 14 can be also established by an automatical operation of the control unit 47. In step S23, it is checked whether or not a response or answer is transmitted to the order station 15. If not, in step S24, it is further checked whether or not the passing of time (i.e. lapsed time) is less than T3. If so, the control goes to S23. If not, the identification of the selected mobile station 14 is stored in the memory 48, the timer T2 is stopped and cleared, and the control goes to step S22.

If the response from the mobile station 14 is transmitted to the order station 15, information from the mobile station 14, such as, identification thereof or other matter is stored in the memory 48 in step S25 and is then displayed on the screen of the CRT 54 in step S26. If there is stored number M in the memory 48, it is displayed on the screen of the CRT 54 together with the identification of the mobile station 14 in step S27A. If the printer 52 is ready for operation (step 28), theses matters are printed out in step S29.

It should be understood that although the preferred embodiment of the present invention has been described in considerable detail, certain modifications, changes may be made by those skilled in the art and that it is hereby intended to cover all modifications, changes and adaptations thereof falling within the scope of the appended claims.

What is claimed is:

1. An information communication system comprising:
   an order station including a transmission device for transmitting a command signal; and
   a mobile station comprising a receiver for receiving the command signal transmitted by said order station, said mobile station further comprising means for transmitting reply information to said order station in response to receiving the transmitted command signal, a memory, a controller for storing to said memory information representing that said reply information has not been transmitted to said order station despite said mobile station receiving the transmitted command signal, and for storing to said memory information representing a position of said mobile station at which the transmitted command signal was received, wherein said controller stores the position information of said mobile station to said memory only when the reply information is not transmitted despite said mobile station receiving the transmitted command signal, and means for transmitting the information stored in said memory to said order station, wherein the position information stored in said memory is used to ascertain why reply information was not transmitted by said mobile station to said order station.

2. The information communications system as defined in claim 1, wherein said memory includes information representing an identifier for identifying the mobile station, and wherein said order station further includes means for receiving information transmitted from said mobile station, and monitor means for displaying received unique identifier information from the mobile station.

3. The information communication system as defined in claim 2, wherein said order station further includes a display for displaying information received from said mobile station, and a printer for printing the displayed information.

4. The information communication system as defined in claim 1, wherein said mobile station further comprises a timer for measuring a lapsed time between receipt of the command signal and transmission of information in response to the command signal.

5. The information communication system as defined in claim 1, wherein said mobile station further comprises a global position sensor receiver for receiving signals transmitted from at least one satellite.

6. The information communication system as defined in claim 1, wherein there are a plurality of mobile stations.

7. The information communication system as defined in claim 1, wherein said mobile station includes means for transmitting information stored in said memory when said mobile station transmits any information to said order station.

8. The information communication system as defined in claim 1, wherein said means for transmitting information stored in said memory transmits the position information and the information representing that said reply information has not been transmitted in such a manner that it can be determined whether an operator of said mobile station decided not to respond to the command signal.

* * * * *